United States Patent
Cordova et al.

[11] Patent Number: 5,742,390
[45] Date of Patent: Apr. 21, 1998

[54] POTTED GYRO SENSOR COIL WITH INTER-TURN STRESS RELIEF

[75] Inventors: Amado Cordova, West Hills; Robert J. Hoover, Newbury Park; Thomas McLean, Woodland Hills; Ralph A. Patterson, Moorpark; John P. Rahn, West Hills, all of Calif.

[73] Assignee: Litton Systems, Inc., Woodland Hills, Calif.

[21] Appl. No.: 751,984

[22] Filed: Nov. 19, 1996

[51] Int. Cl.⁶ .................................................. G01C 19/64
[52] U.S. Cl. .................................................. 356/350
[58] Field of Search .................................................. 356/350

[56] References Cited

U.S. PATENT DOCUMENTS

| | | |
|---|---|---|
| 4,856,900 | 8/1989 | Ivancevic .................... 356/350 |
| 5,444,534 | 8/1995 | Dyott et al. ................. 356/350 |
| 5,546,482 | 8/1996 | Cordova et al. ............. 356/350 |

*Primary Examiner*—Vincent P. McGraw
*Attorney, Agent, or Firm*—Elliott N. Kramsky

[57] ABSTRACT

A potted sensor coil for a fiber optic gyroscope includes an inter-layer stress relief layer of lubricating material. The coil is wound into a known pattern. Various coil configurations can be realized in which a coating layer of lubricant relieves stressing at the interface between the outer jacket of the fiber and the coil potting material.

23 Claims, 1 Drawing Sheet

POTTED GYRO SENSOR COIL WITH INTER-TURN STRESS RELIEF

BACKGROUND

1. Field of the Invention

The present invention relates to fiber optic gyroscopes. More particularly, this invention pertains to a potted sensor coil that includes inter-turn stress relief.

2. Description of the Prior Art

An interferometric fiber optic gyroscope comprises the following main components: (1) a light source, (2) two beamsplitters (fiber optic directional coupler and/or integrated-optics Y-junctions) to satisfy the requirement of a "minimum reciprocal configuration" (S. Ezekiel and M. J. Arditty, *Fiber Optic Rotation Sensors* New York, Springer-Verlag p. 2–26 1982), (3) a fiber sensing optic coil made of either polarization maintaining (PM) fiber or made of low-birefringence (standard telecommunications) fiber, (4) a polarizer (and sometimes one or more depolarizers), and (5) a detector. Light from the light source is split by the loop beamsplitter into copropagating and counterpropagating waves travelling in the sensing coil. The associated electronics measures the phase relationship between the two interfering, counterpropagating beams of light that emerge from opposite ends of the coil. The difference between the phase shifts experienced by the two beams is proportional to the rate of rotation of the platform to which the instrument is fixed, due to the well-known Sagnac effect.

Environmental factors can affect the measured phase shift difference between the counterpropagating beams, thereby introducing a bias error. Such environmental factors include variables such as temperature, vibration (acoustical and mechanical) and magnetic fields. In general, such factors are both time-varying and unevenly distributed throughout the coil. These environmental factors induce variations in the optical light path that each counterpropagating wave encounters as it travels through the coil. The phase shifts induced upon the two waves are unequal, producing a net undesirable phase shift which is indistinguishable from the rotation-induced signal.

One approach to attain a reduction of sensitivities arising from environmental factors has involved the use of various symmetric coil winding configurations. In such coils, the windings are arranged so that the geometrical center of the coil is located at the innermost layer while the two ends of the coil are located at the outermost layers.

N. Frigo has proposed the use of particular winding patterns to compensate for non-reciprocities in "Compensation of Linear Sources of Non-Reciprocity in Sagnac Interferometers", *Fiber Optics and Laser Sensors I*, Proc. SPIE Vol. 412 p. 268 (1983). Furthermore, U.S. Pat. No. 4,793,708 of Bednarz entitled "Fiber Optic Sensing Coil" teaches a symmetric fiber optic sensing coil formed by dualpole or quadrupole winding. The coils described in that patent exhibit enhanced performance over the conventional helix-type winding.

U.S. Pat. No. 4,856,900 of Ivancevic entitled "Quadrupole-Wound Fiber Optic Sensing Coil and Method of Manufacture Thereof" teaches an improved quadrupole-wound coil in which fiber pinching and microbends due to the presence of pop-up fiber segments adjacent the end flanges are overcome by replacing such pop-up segments with concentrically-wound walls of turns for climbing between connecting layers. Both of the aforementioned United States patents are the property of the assignee herein.

While appropriate coil winding techniques minimize some of the bias errors found in the output of a fiber optic gyro, they are not capable of eliminating all of such biases. In particular, the design of the gyro sensor coil can impact the gyro's random walk, bias stability, bias temperature sensitivity, bias temperature-ramp sensitivity, bias vibration sensitivity, bias magnetic sensitivity, scale factor temperature sensitivity and input axis temperature sensitivity.

Furthermore, it is disclosed in U.S. Pat. Ser. No. 5,371,593 of co-inventors Amado Cordova, Donald J. Bilinski, Samuel N. Fersht, Glenn M. Surabian, John D. Wilde and Paul A. Hinman entitled "Sensor Coil For Low Bias Fiber Optic Gyroscope", that the composition of the potting material can have a significant impact upon the bias vibration sensitivity of the fiber optic gyro as a result of changes in fiber length and refractive index brought about by vibration dynamic strains.

The referenced United States patent discloses a sensor coil whose design incorporates a number of features for minimizing the aforesaid environmental factors. Among the issues identified and addressed in that patent is the existence of a relationship between the modulus of elasticity of the potting material and vibration-induced bias. Generally, gyro performance (in terms of vibration) is significantly improved by potting material possessing a high modulus of elasticity (Young's modulus). The modulus should not, however, be so high as to produce other problems related to gyro operation at temperatures significantly removed from the curing temperature of the potting material. Such problems include temperature related coil cracking, h-parameter (polarization cross-coupling) degradation of coils fabricated of PM-fiber, and large bias temperature-ramp sensitivity. U.S. Pat. Ser. No. 5,546,482 of Amado Cordova and Glenn M. Surabian, property of the assignee herein, covering "Potted Fiber Optic Gyro Sensor Coil For Stringent Vibration and Thermal Environments" teaches the selection of polymer potting materials based, in part, upon the relationship between the glass transition temperature of a candidate material and the operational temperature range of the gyro.

Pending U.S. patent application Ser. No. 08/526,725 of Ralph A. Patterson and U.S. Pat. No. 5,545,892 of Donald J. Bilinski, Gene H. Chin, Amado Cordova and Samuel N. Fersht covering "Gyro Sensor Coil With Low-Friction Hub Interface", each property of the assignee herein, disclose spools for gyro sensor coils designed to overcome other problems associated with the properties of adhesive materials when used to encapsulate coils. A substantial differential is generally observed to exist between the radial and axial thermal expansion characteristics of an encapsulated potted sensor coil. Typically, the radial thermal expansion coefficient of a potted sensor coil is less than 10 parts per million (ppm) per degree Centigrade (deg C), whereas the axial thermal expansion coefficient of a potted coil is typically larger than 200 ppm per deg C. This large anisotropy of the thermomechanical properties of a potted coil results from the large differences that exist between the thermal expansion properties of the glass fiber (cladding and core) and the surrounding polymers (in particular, the potting material) and the fact that the fiber turns are fully encapsulated by the potting adhesive, leaving no void spaces therebetween. The net result is that radial expansion of the potted coil is fully determined by the low-expansion, stiff glass fiber turns whereas the axial expansion is determined by the high-expansion, softer potting material.

Each of the above-mentioned pending applications discloses a spool or coil mount that includes a single support flange. This is in contrast to spools employing paired end flanges. The single flange arrangements permit the potted coil to be axially unconstrained, thereby preventing excessive thermal stress on the potted coil, and consequent detrimental effects on gyro bias performance in response to temperature changes. The potted coil would otherwise be prone to such excessive stress due to the greater degree of expansion of the filled coil than of the spool in the axial direction.

Pending U.S. patent application Ser. No. 08/661,166 of Amado Cordova entitled "Bonded Fiber Optic Gyro Sensor Coil Including Voids" addresses the problems posed by the anisotropic thermal expansion properties of potted gyro sensor coils. This application teaches one to reduce this effect by reducing the volume of potting material employed. A number of potting materials are disclosed that may be applied as thin fiber coatings. Such selected materials possess sufficient bonding strength to provide an integral structure while leaving unfilled inter-turn spaces, thereby reducing the volume of adhesive potting material and, consequently, the magnitude of the anisotropic thermal expansion characteristics of the potted coil.

Another source of bias in potted gyro sensor coils results from the mismatch between the thermal expansion characteristics of the material of the outer jacket of the optical fiber and the potting material. So-called "hoop stresses" oriented along the length of the fiber proportionally affect Shupe bias error while debonding stresses perpendicular to the axis of the fiber produce "bias spikes". Such bias spikes reflect the opening and closing of minute cracks between the outer fiber jacket and the potting material. The resultant abrupt changes in boundary conditions produce corresponding changes in Shupe bias.

SUMMARY OF THE INVENTION

The foregoing and additional shortcomings and disadvantages of the prior art are addressed by the present invention that provides, in a first aspect, a sensor coil for a fiber optic gyroscope. Such a coil includes a continuous optical fiber having an outer jacket of a first thermal characteristic. The fiber is arranged into a plurality of concentric cylindrical layers. Each of the layers comprises a plurality of turns arranged in a predetermined winding pattern. The coil is encapsulated within a matrix of potting material of predetermined composition having a second thermal characteristic wherein the first and second thermal characteristics differ. Means are provided for reducing thermally-induced stresses between the outer jacket and the potting material.

In a second aspect, the invention provides a method for forming a potted sensor coil of predetermined size for a fiber optic gyroscope. Such method is begun by applying a layer of potting material to a mandrel. A layer of predetermined lubricant is then applied and, thereafter a layer of optical fiber is wound following a predetermined pattern. Another layer of predetermined lubricant is then applied. This sequence of steps is repeated until a predetermined length of optical fiber has been wound. A final layer of potting material is then applied and the wound and potted coil is then cured.

In a third aspect, the invention provides a method for forming a potted sensor coil of predetermined size for a fiber optic gyroscope. The method is begun by applying a layer of uv-curable potting material. The potting material is cured by applying ultraviolet energy of predetermined intensity for a predetermined period of time. A layer of predetermined lubricant is then applied and, thereafter, a layer of fiber is wound in a predetermined pattern. Another layer of predetermined lubricant is applied. This process is repeated until a predetermined length of optical fiber has been wound. A layer of uv-curable potting material is then applied and cured by applying ultraviolet energy of predetermined intensity for a predetermined period of time.

In a fourth aspect, the invention provides a method for forming a potted sensor coil of predetermined size for a fiber optic gyroscope. The method is begun by applying a coating of predetermined lubricant to an optical fiber, winding the fiber into a plurality of concentric layers, each comprising a plurality of turns, applying a layer of potting material each time a complete layer is wound and curing the potting material.

In a final aspect, the invention provides a method for forming a potted sensor coil of predetermined size for a fiber optic gyroscope. The method is begun by winding a layer of optical fiber in a quadrupole pattern and then applying a layer of potting material. This is repeated until a quadrupole comprising four layers of optical fiber is formed. A predetermined lubricant coating is then applied. This process is repeated until a predetermined length of optical fiber has been wound and potted. The potting material is cured.

The preceding and other features and advantages of the invention will become further apparent from the detailed description that follows. Such description is accompanied by a set of drawing figures. Numerals of the drawing figures, corresponding to those of the written text, point to the various features of this invention with like numerals referring to like features throughout.

DETAILED DESCRIPTION

Figure 1A:
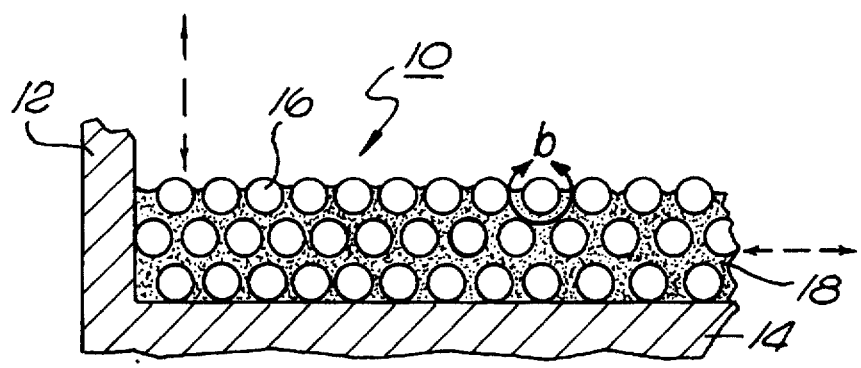
FIG. 1(a) and 1(b) are a cross-sectional view of a portion of a potted sensor coil in accordance with the prior art and an enlarged cross-section of an optical fiber taken at line 1(b)–1(b) of FIG. 1(a), respectively.

FIG. 1(a) is a cross-sectional view of a portion of a potted gyro sensor coil 10 in accordance with the prior art. As shown, the portion of the potted gyro sensor coil 10 is located in the region adjacent the intersection of a flange 12 and mandrel 14 of a coil mount. The coil mount or spool may comprise either a single end flange 12 or a pair thereof as discussed above.

The coil comprises a plurality of turns of a single continuous optical fiber 16 arranged into a predetermined winding pattern. As mentioned earlier, the winding pattern is preferably formed in such a way as to minimize bias effects due to localized environmental factors. Quadrupole and orthocyclic patterns are among those favored for forming a gyro sensor coil.

The wound coil is embedded and encapsulated within an appropriate adhesive potting material 18. The use of a matrix of potting material 18 adds rigidity for resisting vibration-induced bias effects and the like. As discussed above, the composition of the potting material 18 should be carefully chosen to minimize the effects of varying environmental factors, such as temperature, upon gyro bias.

Figure 1B:
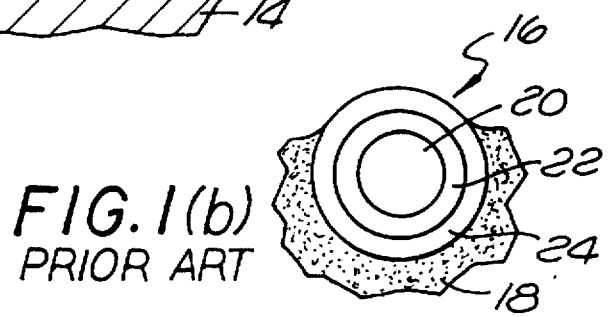

FIG. 1(b) is a greatly-enlarged cross-sectional view of a turn of the optical fiber 16 within the matrix of potting material 18 taken at line 1(b)–1(b) of FIG. 1(a). As can be seen, the optical fiber 16 comprises an interior core and cladding 20 of glass surrounded by an inner jacket 22, typically of silicone or acrylate composition, and an exterior jacket 24, typically acrylate, which serves as a protective outer jacket. Numerous adhesive potting materials may be employed. As the compositions of the exterior jacket 24 and the potting material 18 generally differ, there will exist a discrepancy between the thermal expansion characteristics of these adjacent structures of a potted fiber optic coil. Such mismatch can lead to the presence of Shupe errors due to hoop stress along the length of the fiber 16 and bias spikes as a consequence of minute de-bondings at the interface between the exterior jacket 24 and the potting material 18.

The present invention alleviates the stresses generated by the mismatching of adjacent bonded materials at the interface between the outer jacket 24 of the wound optical fiber and the potting material 18 by interposing a thin layer of lubricant material of preselected composition. The applicant has found that appropriate lubricant materials include high vacuum silicone grease (a paste), silicone oils and mold release (a fluorocarbon). By making the layer of lubricating material very thin, one maintains the integrity of the coil whereby gyro accuracy is not materially compromised by the presence of vibration.

As mentioned above, the presence of thermally-induced stressing at the interface between the exterior jacket 24 and the potting material 18 can produce debonding as well as hoop stress that proportionately affects Shupe bias. While bias spiking does not represent a relatively large error factor in a small (200 meters or less) gyro, this factor constitutes a much more significant contribution to gyro error in larger coils (e.g. three inch diameter, one kilometer fiber length).

The aforesaid layer of lubricating material for reducing thermally-induced stresses at the interface between the exterior jacket of the wound fiber and the potting material can provide various configurations in accordance with the invention. Such configurations reflect various options for introducing the lubricating layer during coil production.

Figure 2:
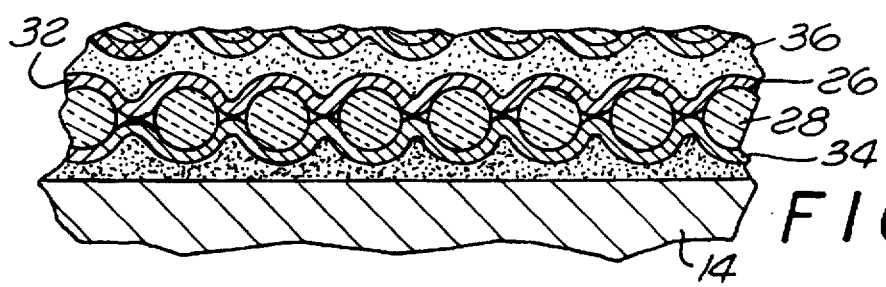
FIG. 2 is a cross-sectional view of a portion of a potted gyro sensor coil in accordance with the invention.

FIG. 2 is a cross-sectional view of a portion of a potted gyro sensor coil in accordance with the invention. As can be seen, the surface 26 of the exterior jacket of a sensor coil wound from an optical fiber 28 is isolated from surrounding potting material 30 by means of layers of lubricating material 32 and 34 that surround the turns of a wound layer of optical fiber 28.

The configuration of FIG. 2 may be obtained by integrating the application of predetermined lubricating material into the normal coil winding process. The nature of the potting material 30 also affects the coil production process. In the case of a thermally-curable adhesive potting material, the entire sensor coil is wound and potted prior to curing. Alternatively, the use of uv-curable potting material permits one to cure the potted coil on a layer-by-layer basis. This can result in substantial reduction of such winding defects as "slumping" that occurs when a turn or turns of a layer of windings will slip to a lower level. This, of course, can compromise the accuracy of an otherwise carefully-chosen winding pattern.

To obtain the configuration of FIG. 2, one employs alternating processes of winding, lubricant application and potting. In the case of a thermally-cured potting material, the process occurs as follows: Potting material 30 is first applied on top of the supporting mandrel. A layer 34 of lubricating material is then either sprayed or brushed over the potting material and a layer of optical fiber 28 wound. Thereafter, an upper layer 32 of lubricant is brushed or sprayed upon the newly-wound layer of optical fiber and another layer of potting material 36 is then applied. As a result of the application of layer 34 beneath the optical fiber 28 and the layer 32 immediately above it, the fiber 28 is lubricatingly-separated from the surrounding potting material layers 30, 36.

As mentioned above, in the case of potting material of thermally-curable composition, the above-described process is continued until the winding and potting of the sensor coil is completed. Thereafter, the wound and potted coil is baked at an appropriate temperature for a predetermined period of time for curing. Alternatively, in the case of uv-curable potting material, the potting material is cured subsequent to its application on a layer-by-layer basis. After winding a layer and the brushing or spraying on an overlying layer of lubricating material, the potting material is applied and then cured by the application of ultra violet energy of predetermined strength for a predetermined period of time.

Figure 3:
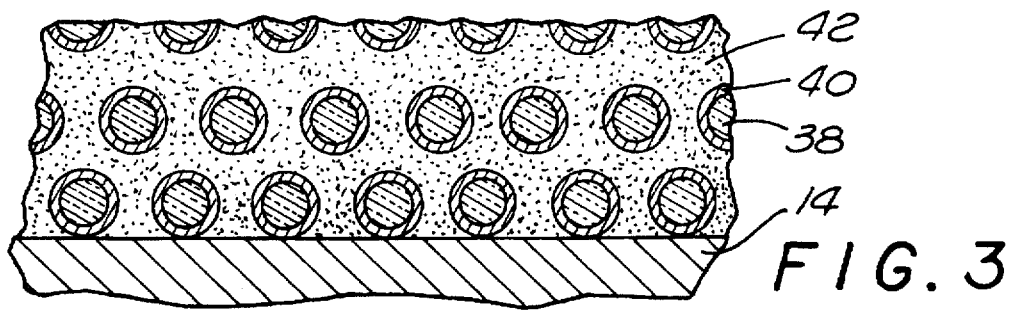
FIG. 3 is a cross-sectional view of an alternative embodiment of a gyro sensor coil in accordance with the invention.

FIG. 3 is a cross-sectional view of a portion of a sensor coil in accordance with an alternative embodiment of the invention. As can be seen, in contrast to embodiment of FIG. 2 the turns of the optical fiber 38 are covered by a thin layer 40 of lubricating material and is interposed between the optical fiber 38 and the surrounding potting material 42. This embodiment can be formed by a somewhat different process from that employed to form the sensor coil of FIG. 2. The optical fiber 38 is coated with a layer of lubricating material 40 during passage through a bath of the lubricating material as the fiber is advanced from a feed to a take-up spool onto which such fiber 38 is wound in a predetermined pattern, with the thin layer 40 of lubricating material continuing to adhere to the outer surface of the fiber 38.

Potting material 42 is applied after each layer has been wound. As before, in the event that thermally-curable potting material 42 is employed, the entire sensor coil is wound and potted. It is then baked at an appropriate temperature for a predetermined period of time to cure the potting material and complete coil formation. In the alternative, when a uv-curable potting material is employed, the coil can be cured immediately subsequent to the application of each layer of potting material. Again, numerous benefits may be realized by such application of uv-cured potting material, including the substantial elimination of slumping defects.

Figure 4:
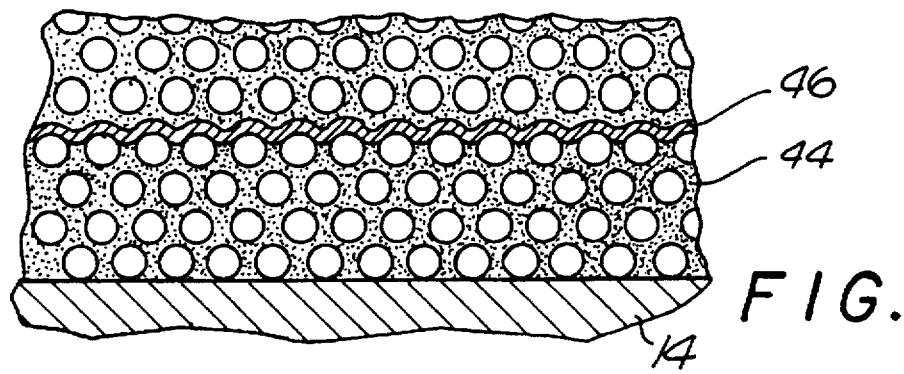
FIG. 4 is a cross-sectional view of a gyro sensor coil in accordance with a second alternative embodiment of the invention.

FIG. 4 is a cross sectional view of a further alternative embodiment of the invention. This embodiment assumes a quadrupole winding pattern. In such a pattern, the optical fiber 44 is wound from its center in two directions (i.e. clockwise (c.w.) and counterclockwise (c.c.w.)) with a repeating pattern being wound over every four layers of turns. The turns of the first and fourth layers are wound in one of such directions (e.g. c.w.) while those of the second and third layers are wound in the opposite direction.

In the embodiment of FIG. 4, sequential quadrupoles comprising four layers of windings are lubricatingly-separated from one another by means of a layer 46 of predetermined lubricant. Every four layers are wounded and potted in accordance with existing practices. Thereafter, a layer 46 of lubricating material is interposed and the process of winding and potting another quadrupole begun. The presence of a lubricating layer 46 to separate each quadrupole segment provides stress relief. The presence of the lubricating layer 46 limits the extent to which stress buildup may occur as it is relieved periodically throughout the coil.

Thus, as can be seen, the present invention provides an improved potted sensor coil for a fiber optic gyro. By employing the teachings of this invention, one may obtain lower gyro errors due to the reduction and substantial elimination of longitudal hoop stresses and transverse debonding stresses.

While this invention has been described with reference to its presently preferred embodiment, it is not limited thereto. Rather, this invention is limited only insofar as defined by the following set of patent claims and includes within its scope all equivalents thereof.

What is claimed is:

1. A method for forming a potted sensor coil of predetermined size for a fiber optic gyroscope comprising the steps of:
    a) applying a layer of potting material to a mandrel; then
    b) applying a layer of predetermined lubricant; then
    c) winding a layer of optical fiber in a predetermined pattern; then
    d) applying a layer of predetermined lubricant; then
    e) repeating steps a through d until a predetermined length of optical fiber has been wound; then
    f) applying a final layer of potting material; and then
    g) curing said potted coil.

2. A method as defined in claim 1 wherein said potting material is thermally curable.

3. A method as defined in claim 2 wherein the curing step comprises heating said coil for a predetermined amount of time at a predetermined temperature.

4. A method for forming a potted sensor coil of predetermined size for a fiber optic gyroscope comprising the steps of:
    a) applying a layer of uv-curable potting material; then
    b) curing said potting material by applying ultraviolet energy of predetermined intensity for a predetermined period of time; then
    c) applying a layer of predetermined lubricant; then
    d) winding a layer of optical fiber in a predetermined pattern; then
    e) applying a layer of predetermined lubricant; then
    f) repeating steps a through e until a predetermined length of optical fiber has been wound; then
    g) applying a final layer of uv-curable potting material; and then
    h) curing said potting material by applying ultraviolet energy of predetermined intensity for a predetermined period of time.

5. A method for forming a potted sensor coil of predetermined size for a fiber optic gyroscope comprising the steps of:
    a) applying a coating of predetermined lubricant to an optical fiber; and
    b) winding said optical fiber into a plurality of concentric layers, each of said layers comprising a plurality of turns; and
    c) applying a layer of potting material each time a complete layer is wound; and
    d) curing said potting material.

6. A method as defined in claim 5 wherein:
    a) said potting material is thermally curable; and
    b) said material is cured after a predetermined length of optical fiber has been wound.

7. A method as defined in claim 6 wherein said coil is cured by heating said coil for a predetermined amount of time at a predetermined temperature.

8. A method as defined in claim 5 wherein:
    a) said potting material is uv-curable; and
    b) each layer of said potting material is cured upon application.

9. A method as defined in claim 8 wherein each of said layers is cured by applying ultraviolet energy of predetermined intensity for a predetermined period of time.

10. A method for forming a potted sensor coil of predetermined size for a fiber optic gyroscope comprising the steps of:
    a) winding a layer of optical fiber in a quadrupole pattern; then
    b) applying a layer of potting material; then
    c) repeating steps a and b until a quadrupole comprising four layers of optical fiber is formed; then
    d) applying a layer of predetermined lubricant coating; then
    e) repeating steps a through d until a predetermined length of optical fiber has been wound and potted; and
    f) curing said potting material.

11. A method as defined in claim 10 wherein:
    a) said potting material is uv curable; and
    b) potting material is cured upon application.

12. A method as defined in claim 11 wherein said potting material is cured by applying ultraviolet energy of predetermined intensity for a predetermined period of time.

13. A method as defined in claim 10 wherein:
    a) said potting material is thermally curable; and
    b) said potting material is cured after winding and potting said coil.

14. A method as defined in claim 13 wherein said potting material is cured by heating said coil for a predetermined amount of time at a predetermined temperature.

15. In a potted sensor coil for a fiber optic gyroscope of the type in which an optical fiber comprising a plurality of turns forms a plurality of wound layers encapsulated within a matrix of an adhesive potting material, the improvement comprising a lubricating material positioned at the interface between the turns of at least one wound layer of said coil and said potting material.

16. A potted sensor coil as defined in claim 15 further comprising at least one continuous layer of said lubricating material.

17. A potted sensor coil as defined in claim 16 wherein said at least one continuous layer of lubricating material contacts the turns of a wound layer of said coil.

18. A potted sensor coil as defined in claim 17 further including:
    a) two continuous layers of lubricating material;
    b) said continuous layers of lubricating material contacting upper and lower arcuate portions of said fiber at the turns of a wound layer of said coil; and
    c) said continuous layers of lubricating material contacting one another between said turns of said wound layer.

19. A potted sensor coil as defined in claim 17 further comprising:
    a) a plurality of continuous layers of lubricating material; and b) said plurality of continuous layers of lubricating material being spaced from one another within said potted coil by a plurality of layers of turns of said optical fiber.

20. A potted sensor coil as defined in claim 19 wherein said layers of lubricating material are spaced from one another by four layers of turns.

21. A potted sensor coil as defined in claim 19 further characterized in that:

a) said fiber comprises a quadrupole-wound pattern; and b) a continuous layer of lubricating material is located between adjacent quadrupoles.

22. A potted sensor coil as defined in claim 15 wherein said lubricating material surrounds said fiber.

23. A potted sensor coil as defined in claim 15 wherein said lubricating material is selected from the group consisting of high vacuum silicone grease, silicone oils and mold release.

* * * * *